United States Patent [19]

Howard et al.

[11] Patent Number: 4,707,054

[45] Date of Patent: Nov. 17, 1987

[54] APPARATUS AND METHOD FOR MAKING A REFLECTION HOLOGRAM

[75] Inventors: Richard K. Howard, Chatham; Colin K. Marshall, Gravesend, both of England

[73] Assignee: GEC Avionics Limited, England

[21] Appl. No.: 833,725

[22] Filed: Feb. 26, 1986

[30] Foreign Application Priority Data

Mar. 13, 1985 [GB] United Kingdom ............. 8506500
Jul. 31, 1985 [GB] United Kingdom ............. 8519272

[51] Int. Cl.$^4$ ............................................. G03H 1/04
[52] U.S. Cl. .................................. 350/3.65; 350/3.7; 350/320
[58] Field of Search .............. 350/3.6, 3.65, 3.69, 350/3.7–3.73, 320

[56] References Cited

FOREIGN PATENT DOCUMENTS

0046218 2/1982 European Pat. Off. .
2071866 9/1981 United Kingdom .

OTHER PUBLICATIONS

Holographic Mirrors, by Magarinos & Coleman, SPIE vol. 523 Applications of Holography (1985), pp. 203–218.

*Primary Examiner*—Bruce Y. Arnold
*Attorney, Agent, or Firm*—Kirschstein, Kirschstein, Ottinger & Israel

[57] ABSTRACT

A method and apparatus for making reflection holograms wherein a film (27) of light sensitive material in which the hologram is to be formed is rotated about a first axis (Y—Y) which is itself rotated about a second axis (X—X) which intersects the first axis at a position (Z) spaced from the film so that a coherent light beam (29), which is directed onto the film and whose axis passes through the point of intersection of the axes, scans the film in a pattern of overlapping narrow bands. The bands may be rectilinear or circular.

14 Claims, 7 Drawing Figures

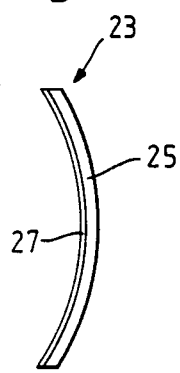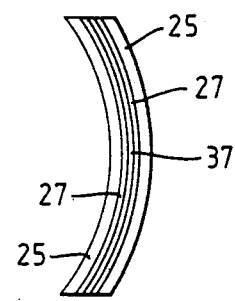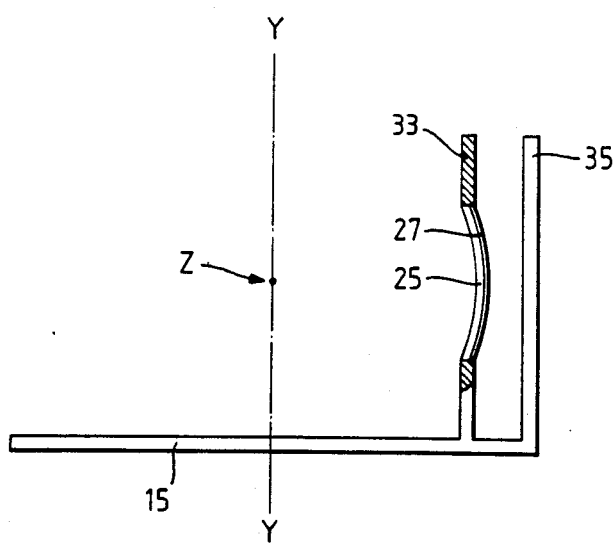

APPARATUS AND METHOD FOR MAKING A REFLECTION HOLOGRAM

This invention relates to a method of making a reflection hologram, to apparatus for use in performing the method and to reflection holograms thereby made.

During the last few years many optical systems have made use of holographic optical elements to save space, weight or accomplish optical effects impossible by conventional methods. One particular group of holograms used as wavelength selective mirrors are known as reflection holograms. These holograms consist of a recording of a set of interference planes creating, within a suitable recording medium, modulations in refractive index or absorption. These modulations act to reflect only light for which the optical path difference between the planes is a multiple of the wavelength of the incident light. This means, since the path difference is angularly dependent, that the wavelength of the reflected light is also dependent on angle and obeys the Bragg condition:

$$\lambda/\cos\theta = \text{constant}$$

where
- $\lambda$ = Wavelength of light reflected
- $\theta$ = Internal angle of incidence of reflected light to hologram planes UK Patent specification No. 2071866 and U.S. Pat. No. 4,395,088 describe and claim a method of creating a reflection hologram using a back reflection technique.

The back reflection method for creating reflection holograms described and claimed in those specifications involves raster scanning an optically transparent light sensitive film with a coherent light beam from a laser, the beam being directed at the film via a construction point and being reflected back into the film after passing through it to produce interference.

The beam is subjected to a fast scanning motion in the horizontal direction and a slow scanning motion in the vertical direction. The beam is of relatively small diameter and the progressive vertical displacement of the beam is sufficiently slow that the beam is incident on each point of the film a large number of times during the raster scan, that is to say the horizontal beam scans are subject to repetitive overlapping with vertical scan movement equal to the beam diameter. The illumination of the entire area is therefore sensibly uniform throughout, and the latent image formed in the film by the standing wave pattern is correspondingly regular.

Whilst the method is of wide utility the described embodiment of the method has certain limitations. Specifically, in the described embodiment the construction point is necessarily relatively distant from the sensitive film, and since the construction point for the creation of the reflection hologram is, in use of the hologram, the centre of eye rotation of the user, the hologram created in accordance with the described embodiment is not useful where the hologram is to be close to the eye rotation position. Thus the production of reflection holograms in accordance with the described embodiment is not useful where, for example, a reflection hologram is to be incorporated one in each of the eyepieces of personal spectacles.

This limitation arises from the apparatus employed. That apparatus has, between the laser and the sensitive film, two co-operating galvanometers each of which carries a reflector. One, the vertical scan galvanometer, executes a slow scan; the horizontal scan galvonometer a fast scan. In any event the optical path between the construction point and the sensitive film is relatively long as a result of the optical elements necessarily present in the path between the laser and the film.

It is an object of the present invention to provide a method of making a reflection hologram wherein this limitation can be avoided.

According to the present invention a method of making a reflection hologram comprises: directing onto a light sensitive film for transmission through the film a beam of coherent light whose axis passes through a construction point; reflecting at least a portion of the coherent light transmitted through said film to create interference in said film between light directly transmitted through said film and the reflected light; causing said beam and said film to move relatively so that said beam scans said film in a pattern of overlapping narrow bands; and processing said film to form a reflection hologram corresponding to the interference pattern resulting from said relative movement; and wherein relative movement is effected by rotating said film about a first axis and rotating said first axis about a second axis which intersects said first axis at said construction point.

In one particular method according to the invention said film is spaced from said first axis and said first axis is rotated about said second axis relatively slowly so that said pattern comprises a multiplicity of substantially rectilinear overlapping bands.

In another particular method according to the invention said first axis intercepts said film, said film is spaced from said second axis, and said first axis is rotated about said second axis relatively slowly so that said pattern comprises a multiplicity of substantially circular concentric overlapping bands.

In a method according to the invention at least one of the speed of rotation of said film about said first axis and the speed of rotation of said first axis about said second axis may be varied so that said film is subjected to substantially uniform exposure to said light beam during scanning.

Said film is suitably in the form of a coating carried on a major surface of an optically transparent substrate, and the light beam is incident on said film only after transmission first through said substrate.

The light beam may be reflected back into said film by reflection within the film at an interface between said film and an external medium.

Alternatively, the light beam may be reflected back into said film by a reflective surface external of said film.

A method according to the invention finds particular application in making optical elements for use as laser eye protection filters.

The invention also provides an apparatus for use in making a reflection hologram comprising: a frame; a gimbal assembly comprising a first member mounted for rotation about a first axis defined by a second member which is mounted for rotation about a second axis defined by said frame, said first and second axes intersecting and said first member including means for supporting a light sensitive film at a position spaced from the point where said axes intersect; and means for respectively rotating said first and second members about said first and second axes so that a light beam whose axis passes through said point where said axes intersect scans a film supported by said first member in a pattern of overlapping narrow bands.

The means for supporting may be adapted to support said film at a position spaced from said first axis.

Alternatively, said means for supporting may be adapted to support said film at a position where it is intercepted by said first axis.

Two methods and apparatus for making reflection holograms in accordance with the invention will now be described, by way of example, with reference to the accompanying drawings in which:

FIG. 2 illustrates an optical element in which a hologram is formed in use of the apparatus of FIG. 1;

FIG. 3 illustrates a modification of the apparatus of FIG. 1;

FIG. 4 illustrates an optical filter incorporating two reflection holograms made with the apparatus of FIG. 1;

Figure 1:
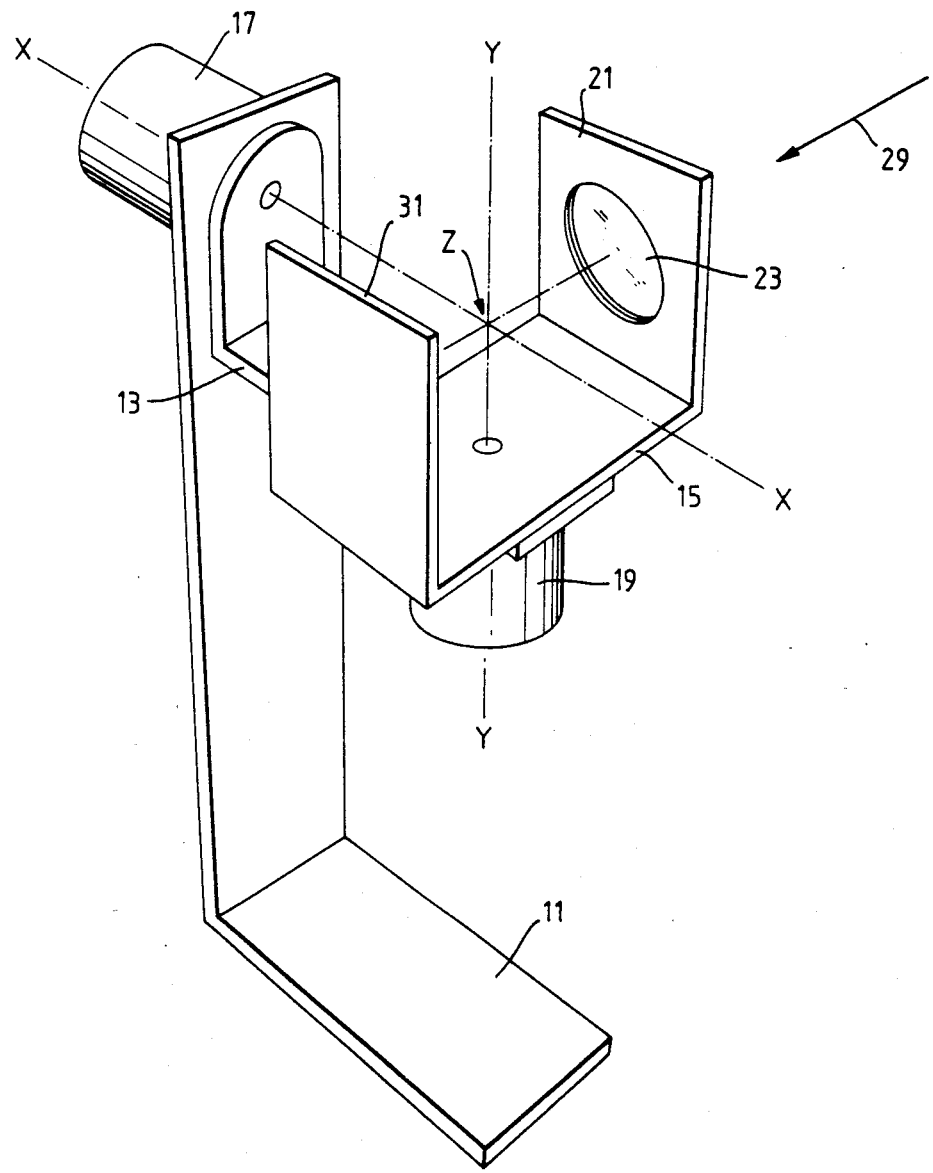
FIG. 1 is a diagrammatic perspective view of a first apparatus.

Referring to FIG. 1, the first apparatus to be described comprises a frame 11, which also acts as a stand, and a gimbal assembly comprising two members 13 and 15. The member 13, which is L-shaped, is mounted via one limb on the frame 11 for rotation about an axis X—X and the member 15 is mounted on the other limb of member 13 for rotation about an axis Y—Y, the axis Y—Y intersecting the axis X—X orthogonally at a point Z. The gimbal assembly 13, 15 is angularly displaceable about the axis X—X by means of a d.c. stepping motor 17 mounted on the frame 11, and the member 15 is rotatable about the axis Y—Y by means of a d.c. motor 19 mounted on the member 13.

The member 15 is in the form of a generally U-shaped member whose arms 21 and 31 are equally spaced from and parallel to the axis Y—Y. One arm 21 is apertured and carries over the aperture an optically transparent body 23 (FIG. 2) consisting of a part-spherical optically transparent substrate 25 of, for example, glass, having on its concavely curved surface a dichromated gelatin film or coating 27. The body 23 is mounted so that the convexly curved surface of the glass substrate 25 is outwardly facing in relation to the axis of rotation Y—Y of the member 15.

In use of the apparatus a laser (not shown) is located spaced from the apparatus and coherent light from the laser forms a beam, indicated by arrow 29, of diameter about 2 millimeters whose axis extends horizontally at right angles to the axis X—X so as to pass through the point of intersection Z of the axes X—X and Y—Y. The distance of the point of intersection Z from the coating 27 is chosen to be the distance at which the reflection hologram to be created in the coating is to be viewed. In the case where the hologram is to be a filter occupying an eyepiece of personal spectacles to be worn by the observer, this distance will be chosen to be the same as the distance to the centre of eye rotation, that is to say, typically, between 2 and 3 centimeters.

The stepping motor 17 is operated so that the gimbal assembly 13, 15 is angularly displaced in regular steps through an appropriate angle, e.g. 100°, about the axis X—X in a period of four minutes and the d.c. motor 19 is operated so as to rotate the member 15 and hence the body 23 about the axis Y—Y at a rate of 200 to 300 revolutions per minute.

As a result of its fast rotation rate about the axis Y—Y and its slower displacement about the axis X—X, the body 23 is effectively subjected to a scan action by the laser beam 29. Because of the relative rates of angular displacement about the two axes and as a result also of the diameter of the beam, each point on the body 23 is scanned fifty or more times during the angular displacement about the axis X—X. The result is that a uniform and regular interference pattern is created in the sensitive coating 27 as a result of Fresnel back reflection within the coating of a small percentage of the laser light, e.g. 4%, at the coating/air interface, the reflected coherent light creating, by interference with light directly transmitted through the coating 27, a latent image for the hologram. The coating 27 is then processed in conventional manner to develop and fix the latent image in the coating, as described for example in the above mentioned UK and U.S. patent specifications, to form a reflection hologram for viewing.

Since the laser beam 29 is directed along a path containing the intersection point Z that point constitutes the construction point for the hologram and since the point Z is, in use, the centre of eye rotation of the wearer, the hologram is effective for angular eye movements of the wearer's eye through a range ±50° in all directions about the optical axis of the hologram. Of course, the angular range may be varied according to the requirement and, indeed, where the hologram is to be viewed from a greater distance the apparatus would be correspondingly modified to define the appropriate eye rotation position for the hologram.

The nature of the method requires that the sensitive coating 27 should be more remote from the laser than the substrate 25 when being scanned so that the laser beam is transmitted first by the substrate 25 and then by the coating 27. Since the member 15 is in continuous rotation about the axis Y—Y it is necessary, therefore, to prevent the laser beam from irradiating the coating directly during each rotation. The other arm 31 of the member 15 serves as an obturator for this purpose.

It will be apparent that other means could be employed to prevent the coating 27 receiving coherent light directly from the laser, i.e. other than by way of the glass substrate 25. For example, the member 15 may be subjected to a rapid oscillatory motion so that the coating 27 is never presented directly to the laser beam. Alternatively, means may be provided for switching the laser off, or introducing an obturator into the path between the laser and the body 23, at appropriate times.

A modification of the apparatus illustrated in FIG. 3 allows a hologram to be constructed with the dichromated gelatin coating 27 on the convexly curved surface of the glass substrate 25 in this mofification the member 15, instead of being U-shaped, has a first arm 33 to one side of the axis Y—Y which is apertured and carries the body 23 with the concavely curved surface of the substrate 25 facing inwardly, and a second arm 35 positioned on the same side of axis Y—Y as arm 33, outwardly of the arm 33, which serves as an obturator.

A pair of reflection holograms made respectively with the apparatus of FIG. 1 and the modified apparatus of FIG. 3 may be used to make an optical filter as shown in FIG. 4. In the arrangement of FIG. 4 the glass substrates 25 are outermost and the confronting coatings 27 are bonded together by an optical cement 37 of matching refractive index, the coatings 27 containing holograms tuned to light of different wavelengths. Such a filter may have further coatings on its outer surfaces, such further coatings being not necessarily holographic coatings.

It will be appreciated that with the method and apparatus described above with reference to FIGS. 1 to 3 the exposure energy used in forming the hologram is not constant over the area of the coating 27.

This deficiency may be cured (a) by modulation of the laser exposure power, and (b) by modulation of the speed of the two motors 17 and 19 employed.

These modulations call for synchronisation between the motors and the laser power. Such complications, whilst possible, are generally undesirable.

A further feature of the apparatus of FIGS. 1 to 3 is that the area scanned is typically generally rectangular whilst filters are often, as described, required to be of generally circular form.

These problems are alleviated in the second apparatus and method to be described by way of example.

Figure 5:
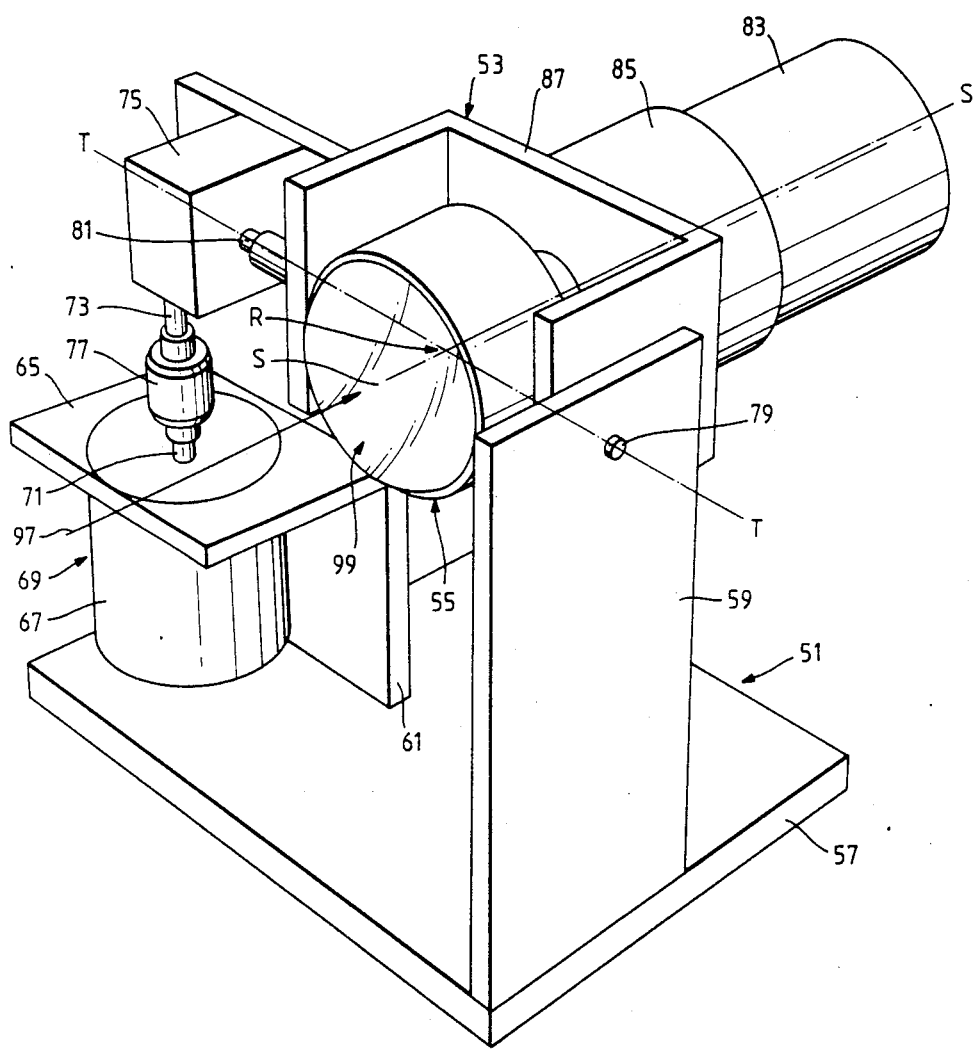
FIG. 5 is a diagrammatic perspective view of a second apparatus.
Figure 6:
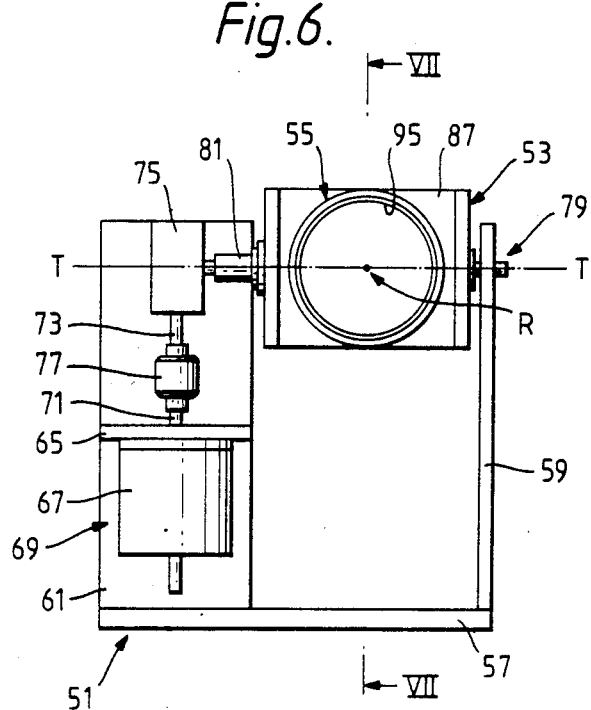
FIG. 6 is a front elevation of the apparatus of FIG. 5.
Figure 7:
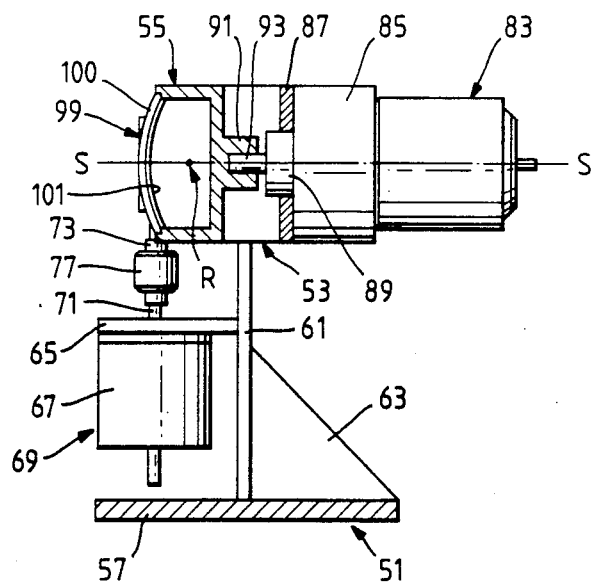
FIG. 7 is a sectional view along the line VII—VII in FIG. 6.

Referring now to FIGS. 5 to 7, the second apparatus comprises a frame 51 which also acts as a stand, and a gimbal assembly comprising two members 53 and 55.

The frame 51 comprises a base plate 57, a side plate 59 upright on the base plate 57, a transverse plate 61 also upright on the base plate 57, being supported by a web member 63, and a further plate 65 outstanding from the transverse plate 61, parallel to the base plate 57.

The housing 67 of a stepper motor 69 is secured to the plate 65 with the motor shaft 71 projecting through an aperture in the plate 65. The shaft 71 is connected to the input shaft 73 of a reduction gear box 75 by way of the flexible coupling 77. The gimbal member 53, which is channel-shapped, is supported at one side in a bearing 79 in the side plate 59, and, at the other side, is supported by the output shaft 81 of the gear box 75.

A d.c. motor 83 having a gear head 85 is secured to the web portion 87 of the member 53, the housing of the gear head 75 having a cylindrical end portion 89 which projects through an opening in the web portion 87.

The member 55, which is cup-shaped and serves as a holder for an optical element 99 in which a hologram is to be made, has at its base a central cylindrical boss 91 provided with a blind axial passage which receives the output shaft 93 of the gear head 85. A radial screw (not shown) through the boss 91 secures the holder member 55 to the output shaft 93.

The axis of rotation S—S of the output shaft 93 and hence the holder 55, intersects at right angles the axis of rotation T—T of the member 53, extending between the output shaft 81 of the reduction gear box 75 and the support bearing 79 in the side plate 59 of the frame 51, at a point R spaced from the plane of the open end of the member 55. In use of the apparatus the optical element 99 to be processed, e.g. to constitute an eye protection filter, is held in the holder 55 within an annular recess 95 extending circumferentially around the open end of the member 55 (see FIG. 6 where element 99 is omitted), so as to be centrally intercepted by the axis S—S.

A digital computer (not shown) controls the stepping rate of the motor 69. The amplitude of each stepping motion of the motor 69 produces through the gearing of the gear box 75 a very small angular displacement of the member 55 about the axis T—T. The magnitude of the small angular displacement is, as will be explained hereafter, related to the diameter of a laser beam indicated by arrow 97, used to form the hologram.

As shown best in FIG. 7, the optical element 99 comprises a part-spherical substrate 100 consisting of glass having two spherical surfaces, one convex and the other concave, with a transparent photo-sensitive coating 101, e.g. a coating of dichromated gelatin, adherent to the concave surface.

The optical element 99 is, in use, received with its rim located within the annular recess 95 extending circumferentially around the open end of the holder 55 with its convex surface facing outwardly.

In operation, with the holder 55, and hence the optical element 99, in rotation about the axis S—S under the drive of the d.c. motor 83 and gear head 85, and with the laser beam 97 directed onto the outer surface of element 99 with the axis of the beam 97 horizontal, orthogonal to the axis S—S and passing through the point of intersection R of the axes S—S and T—T, minute incremental angular displacements about the axis T—T are imparted to the member 53, and hence the holder 55 and element 99, under the action of the computer controlled stepper motor 69 and reduction gear box 75. The resulting locus traced by the laser beam 97 at the element 99 comprises a multiplicity of overlapping narrow concentric bands, each band being, in width, equal to the laser beam diameter. By virtue of the relationship between the magnitude of each angular displacement about the axis T—T and the diameter of the laser beam a large number of overlapping such bands are produced, each point of the coating 101 being thus exposed to the laser beam between fifty and a hundred times.

As in the apparatus and method of FIGS. 1 to 3 the latent image for the hologram is formed by back reflection of the laser beam 97 at the coating/air interface, i.e. relies on Fresnel reflection, the laser light which is back reflected at that interface and the laser light being directly transmitted through the coating 101 creating an interference pattern within the coating 101.

In order that the coating is uniformly exposed to the laser light across its entire area the rate of stepping of the motor 69 only is, under control of the computer, made to vary in dependence upon the point of the coating 101 currently being exposed to the laser beam 97. In the absence of such control, for points at or near the centre of the coating 101, i.e. near the axis S—S, the linear speed of the coating would be low by comparison with the speed of points of the coating 101 at or near the periphery thereof. To achieve uniformity of exposure therefore, the incremental rate of change of angle of the member 53 about the axis T—T and, hence, the rate of stepping of the motor 69 only has to be made to vary progressively from a relatively high value when the laser beam 97 is incident at the centre of the coating 101 to a much lower value when the beam 97 is incident on the coating 101 at its periphery.

After exposure of the coating in the aforesaid manner, the coating 101 with the latent image formed within it is processed, using conventional techniques, so that the latent image is developed and fixed to form the desired reflection hologram in the coating.

It will be appreciated that whilst in the foregoing description the coating 101 is described as being adherent to the concave surface of the glass substrate 100 of the element 99, the coating could equally be made adherent to the convex surface of the substrate. In this event, the member 55 will be adapted to receive the element 99 with its convex surface facing inwardly at a location on the side of the point of intersection R remote from the source of the laser beam 97.

Two part-spherical optical elements, one formed with its hologram in a coating on its concave surface and the other formed in a coating on its convex surface, can be bonded together convex surface to concave surface using an optical cement between the two holographic coatings as described above in relation to FIG. 4, to form a composite optical element tuned to two different frequencies.

In a modification of the apparatus of FIGS. 5 to 7, the stepper motor 69 may be replaced by a motor capable of continuous operation so that the locus traced by the laser beam 97 on the coating 101 is of spiral form instead of in the form of concentric bands.

It will be understood that whilst in the methods and apparatus described above by way of example, interference is obtained in the sensitive coating by Fresnal back reflection within the coating at an interface between the coating and an external medium, e.g. air, in other methods and apparatus in accordance with the invention interference may be obtained due to back reflection of light into the coating by means of a mirror surface adjacent the coating.

It will further be understood that whilst the holograms made with the apparatus and methods described above by way of example are of part spherical shape the method and apparatus according to the invention may be used to make holograms of other shapes.

We claim:

1. A method of making a reflection hologram comprising: directing onto a light sensitive film for transmission through the film a beam of coherent light whose axis passes through a construction point; reflecting at least a portion of the coherent light transmitted through said film to create interference in said film between light directly transmitted through said film and the reflected light; causing said beam and said film to move relatively so that said beam scans said film in a pattern of overlapping narrow bands; and processing said film to form a reflection hologram corresponding to the interference pattern resulting from said relative movement; and wherein said relative movement is effected by rotating said film about a first axis and rotating said first axis about a second axis which intersects said first axis at said construction point.

2. A method according to claim 1 wherein said film is spaced from said first axis and said first axis is rotated about said second axis relatively slowly so that said pattern comprises a multiplicity of substantially rectilinear overlapping bands.

3. A method according to claim 2 wherein said film is subject to oscillating motion about said first axis through an angle such that said light is incident on said film from one side only.

4. A method according to claim 2 wherein said film is subject to cyclic rotation about said first axis, and means is provided for ensuring that said light is incident on said film from one side only.

5. A method according to claim 1 wherein said film is intercepted by said first axis and spaced from said second axis, and said first axis is rotated about said second axis relatively slowly so that said pattern comprises a multiplicity of substantially circular concentric overlapping bands.

6. A method according to claim 5 wherein said first axis is rotated continuously about said second axis so that said bands are successive convolutions of a spiral.

7. A method according to claim 5 wherein said first axis is rotated in steps about said second axis so that said bands are concentric bands of differing radius.

8. A method according to claim 1 wherein at least one of the speed of rotation of said film about said first axis and the speed of rotation of said first axis about said second axis is varied so that said film is subjected to substantially uniform exposure to said light beam during scanning.

9. A method according to claim 1 wherein said film is in the form of a coating carried on a major surface of an optically transparent substrate, and the light beam is incident on said film only after transmission first through said substrate.

10. A method according to claim 1 wherein said light beam is reflected back into said film by reflection within the film at an interface between said film and an external medium.

11. A method according to claim 1 wherein said light beam is reflected back into said film by a reflective surface external of said film.

12. An apparatus for use in making a reflection hologram comprising: a frame; a gimbal assembly comprising a first member mounted for rotation about a first axis defined by a second member which is mounted for rotation about a second axis defined by said frame, said first and second axes intersecting and said first member including means for supporting a light sensitive film at a position spaced from the point where said axes intersect; and means for respectively rotating said first and second members about said first and second axes so that a light beam whose axis passes through said point where said axes intersect scans a film supported by said first member in a pattern of overlapping narrow bands.

13. An apparatus according to claim 12 wherein said means for supporting is adapted to support said film at a position spaced from said first axis.

14. An apparatus according to claim 12 wherein said means for supporting is adapted to support said film at a position where it is intercepted by said first axis.

* * * * *